No. 886,226.
PATENTED APR. 28, 1908.
C. LORENSON.
MOWER.
APPLICATION FILED DEC. 18, 1905.
3 SHEETS—SHEET 2.
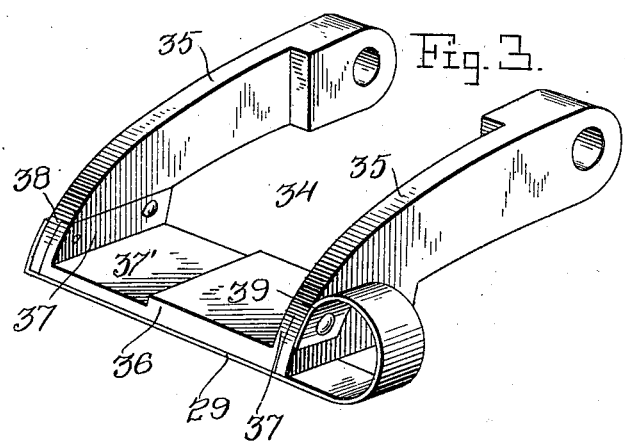
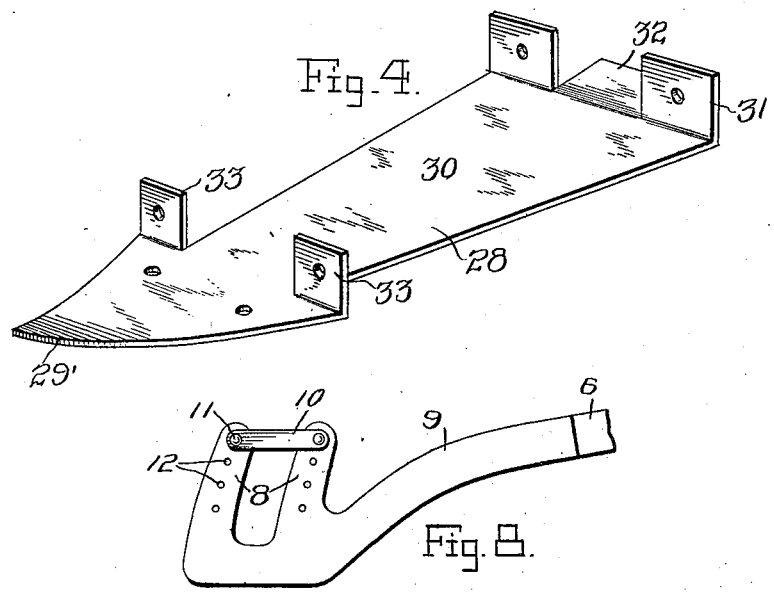
Witnesses
C. K. Reichenbach
F. C. Jones
Inventor
C. Lorenson
By
Attorneys No. 886,226. PATENTED APR. 28, 1908.
C. LORENSON.
MOWER.
APPLICATION FILED DEC. 18, 1905.
3 SHEETS—SHEET 3.
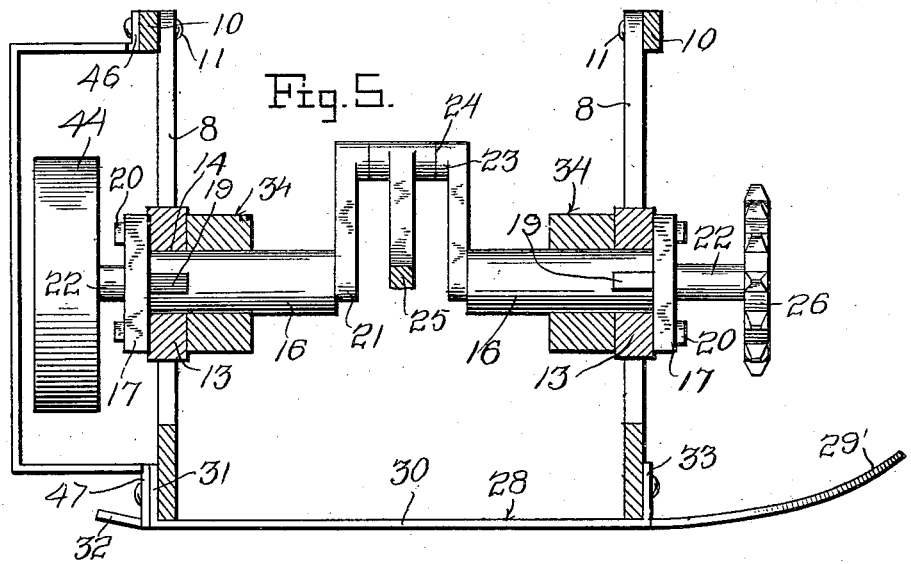
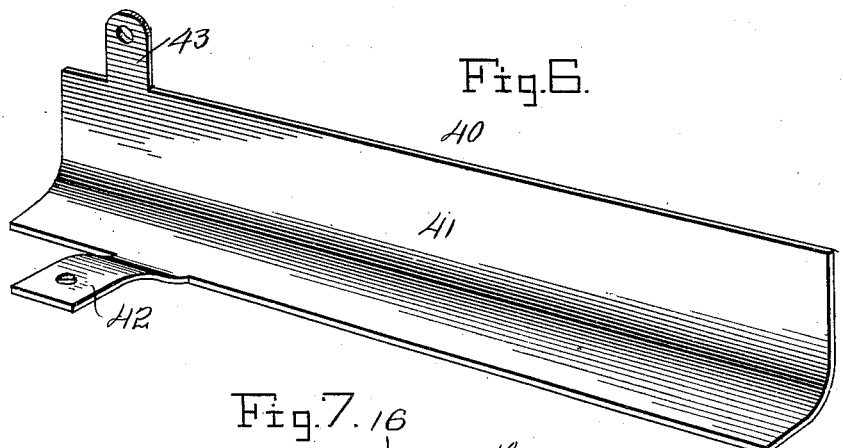
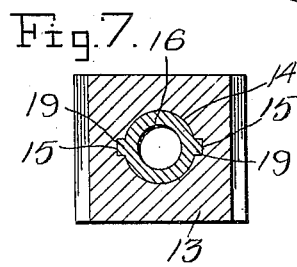

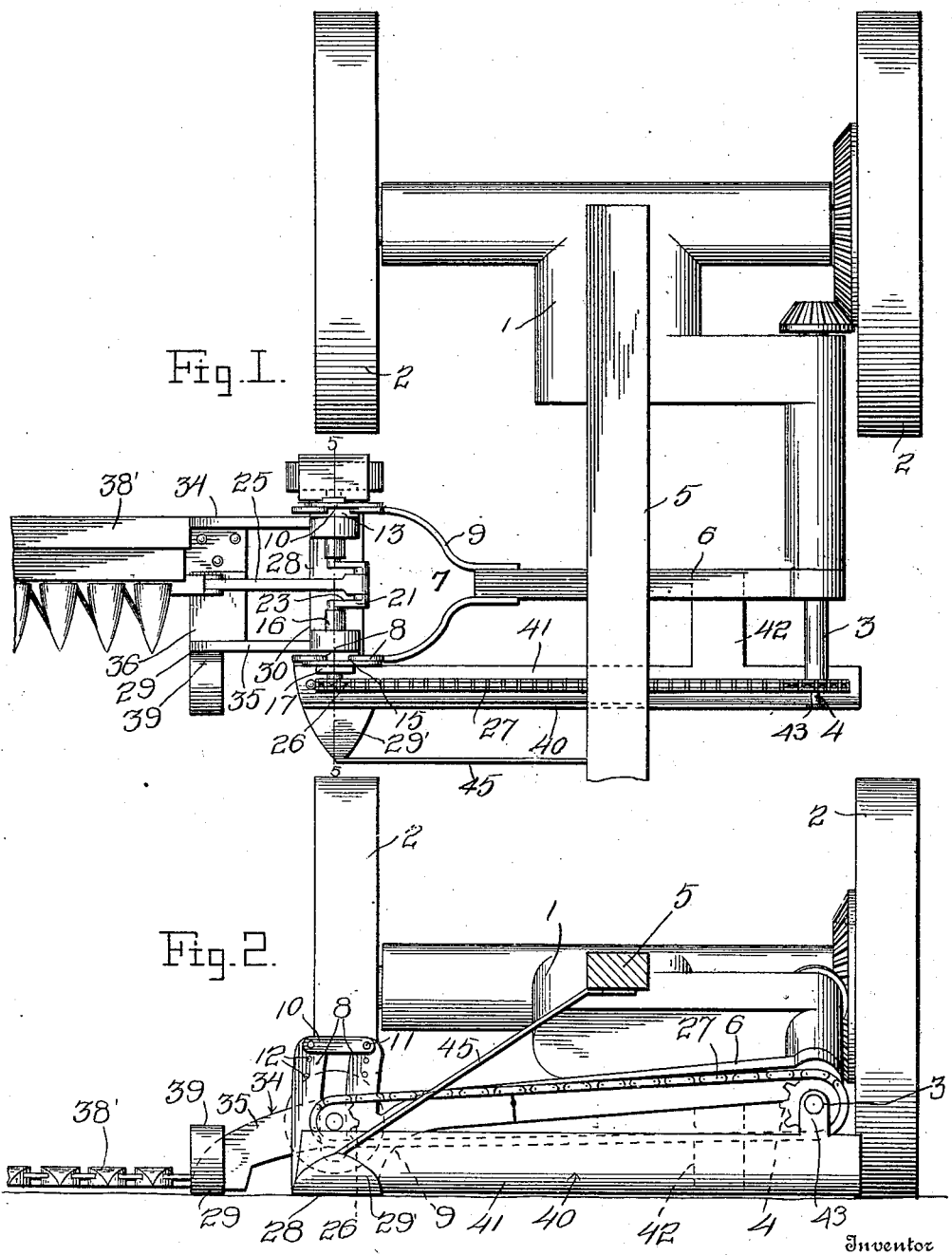

UNITED STATES PATENT OFFICE.

CARL LORENSON, OF WAUSA, NEBRASKA.

MOWER.

No. 886,226.　　　　　Specification of Letters Patent.　　　Patented April 28, 1908.

Application filed December 18, 1905. Serial No. 292,321.

*To all whom it may concern:*

Be it known that I, CARL LORENSON, a citizen of the United States, residing at Wausa, in the county of Knox, State of Nebraska, have invented certain new and useful Improvements in Mowers; and I do hereby declare the following to be a full, clear, and exact description of the invention, such as will enable others skilled in the art to which it appertains to make and use the same.

This invention relates to mowers and has for its object to improve the construction of mower disclosed in my patent dated November 6, 1906, and numbered 835,447.

The invention resides in the provision of an improved form of runner to guide the cutter-bar over inequalities of ground and to provide a novel form of guard for the drive-chain of the mower.

In the accompanying drawings: Figure 1 is a top plan view of a mower embodying my invention. Fig. 2 is a front elevation of the same. Fig. 3 is a detail perspective view of the hanger for the finger bar. Fig. 4 is a detail view of the runner for the guides. Fig. 5 is a detail transverse sectional view on the line 5—5 of Fig. 1, and, Fig. 6 is a detail perspective view of the chain-guard. Fig. 7 is a detail sectional view of one of the bearing blocks. Fig. 8 is a side view of the standards and their arms showing the construction and arrangement of the parts.

Referring to the drawings, the numeral 1 denotes the frame of a mower supported by ground-wheels 2. Mounted in the frame 1 is a shaft 3 which is driven by means of gear connections with one of the ground-wheels and which is provided at its forward end with a sprocket-gear 4. The frame also includes a draft-pole or tongue 5.

Pivotally connected at one of its ends to the shaft 3 is an arm 6 upon opposite sides of which at its opposite end are secured guide-members 7 which include each a pair of upwardly extending standards 8 and a rearwardly directed arm 9, by means of which said side members are connected to the arm 6. A connecting bar 10 serves to connect the standards 8, the ends of the said bar being secured to the respective standard by means of bolts 11, the said bolts being arranged for interchangeable engagement in any one of a series of openings 12 in each of the standards for a purpose to be hereinafter described. The opposing edges of the standards 8 of each guide member are correspondingly curved in the arc of a circle having the shaft 3 as a radius. Bearing blocks 13 are slidably mounted between each pair of standards 8, the said blocks being grooved at opposite edges to receive the curved edges of the standards. Each of the blocks 13 are provided with an opening 14 and with grooves 15 upon opposite sides of the wall of the opening. Bearing sleeves 16 are provided at one of their ends with heads 17 and upon opposite sides with ribs 19 which extend longitudinally of the said sleeve and which terminate short of the other end of the same. The bearing sleeves are engaged through the openings 14 in the bearing blocks 13 with their ribs 19 in the grooves 15, the heads of the said sleeves bearing against the outer faces of the blocks and being secured thereto by means of bolts or other suitable fastening means 20. The end of each of the sleeves opposite to the head extends inwardly beyond the said bearing blocks, the said ends of the sleeves lying directly in opposition to each other.

A crank shaft 21 has its ends 22 journaled in the bearing sleeves 16 and is provided with an enlarged crank portion 23, the ends of the enlargement abutting the ends of the bearing sleeves thereby holding the shaft in its proper position. The shaft 21 has its enlarged crank portion 23 grooved annularly as at 24 for connection with the usual pitman 25. Mounted upon the forward end of the shaft 21 and in advance of the bearing block 13 is a sprocket-gear 26 over which and the sprocket-gear 4 is passed a chain 27.

In order to guide the cutter bar over inequalities of ground, I provide shoes 28 and 29. The shoe 28 includes an upwardly curved toe 29' and a rearwardly extending shank 30. The rear end of the shank 30 is provided at its side with upwardly directed apertured ears 31, the portion of the shank lying between the said ears being inclined upwardly as at 32. The rear portion of the toe 29' is of greater width than the forward portion of the shank, and is provided with upturned apertured ears 33, the ears 31 being bolted to one of the guide members 8 and the ears 33 being bolted to the other of the said guide-members.

Pivotally mounted upon the inner ends of the bearing sleeves 16 is a hanger 34 including spaced arms 35 and a connecting plate 36, the connecting plate 36 being provided at its end with upwardly directed flanges 37 which are secured in recesses 38 formed in the opposing faces of the spaced arm 35. The connecting plate 36 is recessed as at 37' to receive the inner end of the finger-bar 38' of the machine, the said cutter-bar being secured to the said plate and in the said recess in any suitable manner. The shoe 29 is connected at its rear end to the outer face of the rear one of the arms 35 and extends forwardly under the plate 36 and has its forward end curved upwardly and thence downwardly as at 39 and secured to the outer face of the front one of the arms 35.

A chain-guard 40 comprises a trough-like body portion 41 which is provided with upwardly directed ears 42 and 43 which extend from the sides of the body-portion 41. At its opposite end, the chain-guard 40 is bolted or otherwise secured to the upper face of the toe 29' of the shoe 28 and extends across the front of the machine and directly beneath the chain 27, the ear 42 being bolted to the underside of the arm 6 and the ear 43 being hung upon the outer end of the shaft 3. A brace-rod 45 is secured at one of its ends to the forward portion of the toe 29' and at the other of its ends to the tongue 5.

From the foregoing it will be seen that the brackets 8, with which the shoes 28 and 29 are connected may move up and down on the bearing-blocks 13 of the crank shaft in order that the shoes may accommodate themselves to inequalities of the surface of the ground over which they travel without disturbing the position of the crank-shaft. It is understood, of course, that the hanger 35 and finger-bar 38' supported thereby will also be permitted to rise and fall with the shoe so as to prevent injury to the cutting mechanism of the mower.

The connecting bars 10 are made adjustable on the standards 8 so as to vary the extent of movement of said standards on the bearing-block 13 of the crank-shaft, it being desirable in some instances to have the extent of the said movement greater than in others.

A fly wheel 44 is mounted upon the opposite end of the shaft 22 from the sprocket wheel 26 and is protected by means of a shield 46 which is attached at one end thereof to the connecting bar 10 and the opposite end to the ears 31 of the shoe 28.

Inasmuch as the shield is not essential to the invention, when the bar 10 is adjusted on the standards 8, so that said bar cannot well serve as a support for the shield, the latter may be taken off altogether.

What is claimed is:

1. A machine of the class described comprising a frame, a shaft rotatably mounted in said frame, means for rotating said shaft, an arm supported by said shaft, guide-members carried by said arm, bearing-blocks mounted in said guide-members, bearing-sleeves extended through said blocks, a hanger pivotally mounted upon said bearing sleeves, a finger-bar connected at one of its ends to said hanger, a crank-shaft mounted in said bearing-sleeves, a sprocket-gear carried by said first-named shaft, a sprocket-gear carried by said crank-shaft, a chain connecting said sprocket-gears, a shoe and attached parts connected with said guide-members, and a chain-guard connected at one of its ends to said shoe and extending beneath said sprocket-chain.

2. A machine of the class described comprising a frame, a shaft rotatably mounted in said frame, means for rotating said shaft, an arm supported by said shaft, guide-members carried by said arm, bearing-blocks mounted in said guide-members, bearing sleeves extended through said blocks, a hanger pivotally mounted upon said bearing-sleeves, a finger-bar connected at one of its ends with said hanger, a crank shaft mounted in said bearing sleeves, a sprocket-gear carried by said first-named shaft, a sprocket-gear carried by said crank-shaft, a chain connecting said sprocket-gears, a shoe and attached parts connected with said guide-members, and a chain-guard connected at one of its ends to said shoe and provided at the other of its ends with ears, the said ears being connected one to the said arm and the other to the said first-named shaft.

3. A machine of the class described comprising a frame, a shaft rotatably mounted in said frame, means for rotating said shaft, an arm supported by said shaft, guide-members carried by said arm, bearing-blocks mounted in said guide-members, said bearing-blocks being formed with an opening having grooved walls, bearing-sleeves engaged in said bearing-blocks, said bearing-sleeves being provided with ribs for engagement in said grooves, a hanger supported by said bearing-sleeves, a finger-bar supported at one of its ends by said hanger, a crank-shaft mounted in said bearing sleeves, a sprocket-gear carried by said first-named shaft, a sprocket-gear carried by said crank-shaft, a sprocket-chain connecting said sprocket-gears, a shoe and attached parts connected with said guide-members, and a chain-guard arranged beneath said sprocket-chain.

In testimony whereof, I affix my signature, in presence of two witnesses.

CARL LORENSON.

Witnesses:
 CHRIS. LARSON,
 FRANK E. LARSON,